July 24, 1951     T. J. VALENTINO ET AL     2,561,602
APPARATUS FOR MAKING AURAL ANNOUNCEMENTS
Filed July 29, 1947          4 Sheets-Sheet 1

INVENTORS.
THOMAS J. VALENTINO
ROBERT FINE
BY
Irving T. Goodfriend
ATTORNEY

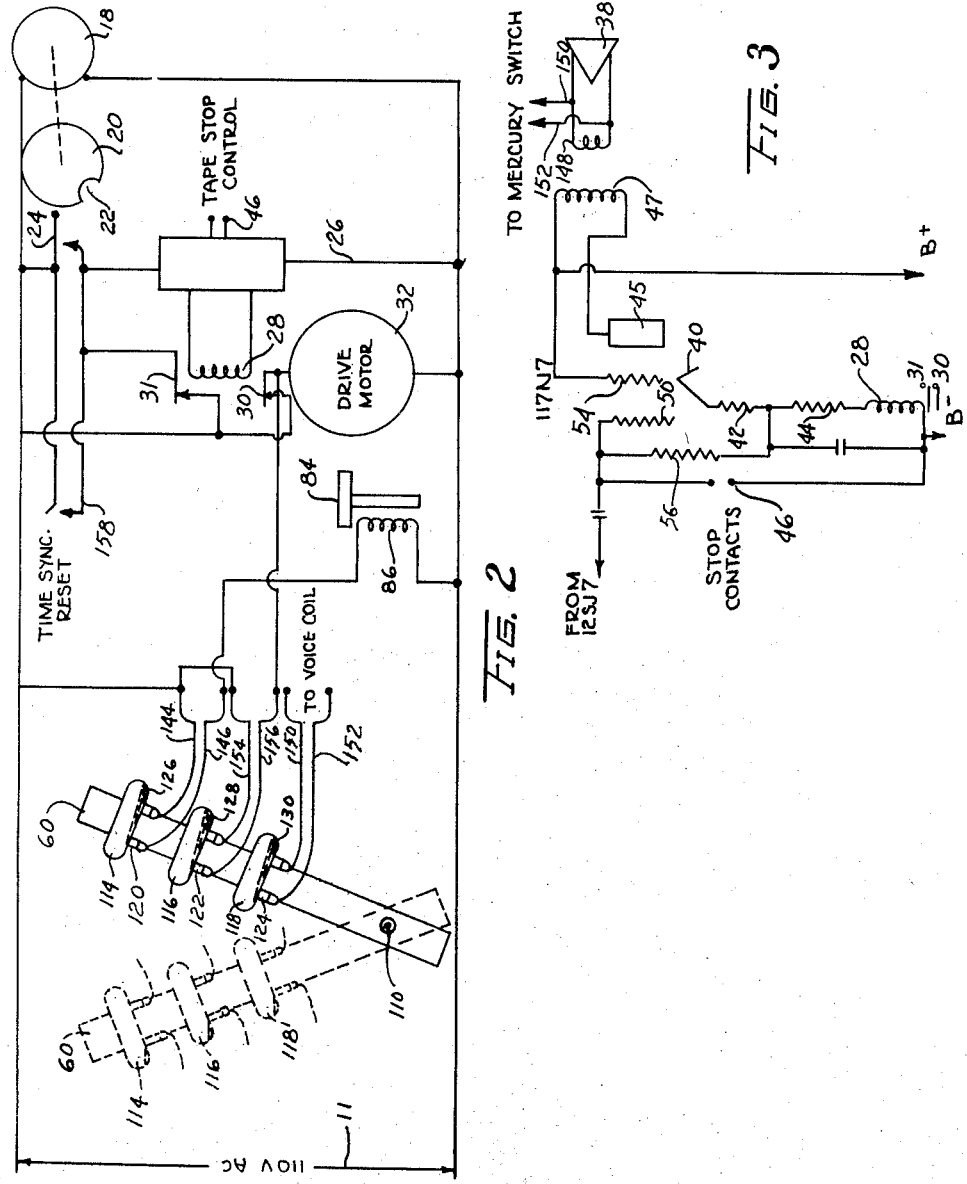

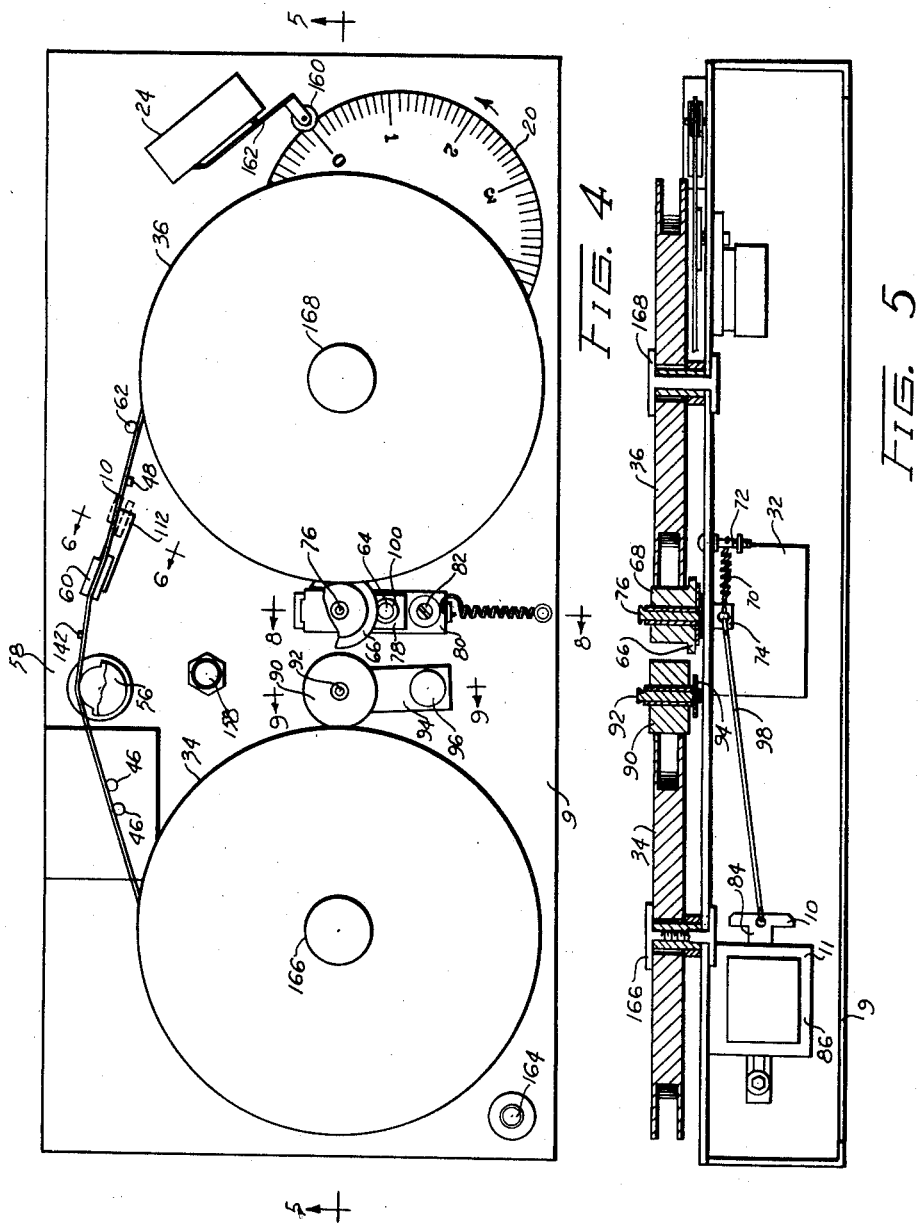

July 24, 1951  T. J. VALENTINO ET AL  2,561,602
APPARATUS FOR MAKING AURAL ANNOUNCEMENTS
Filed July 29, 1947  4 Sheets-Sheet 4
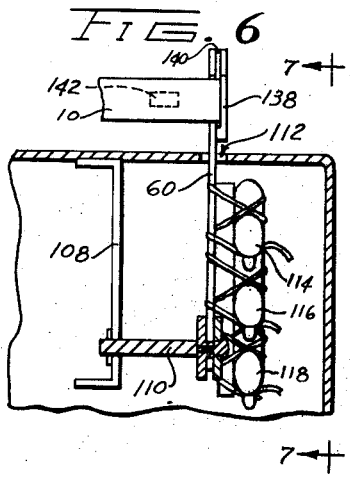
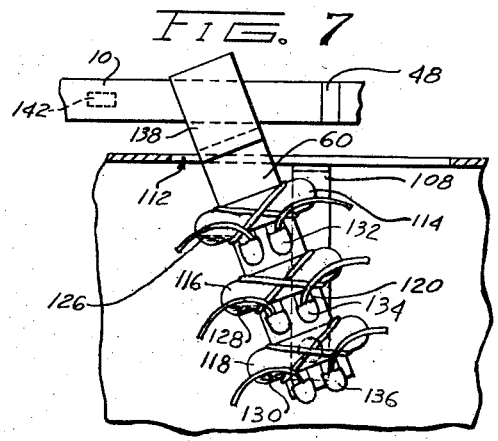
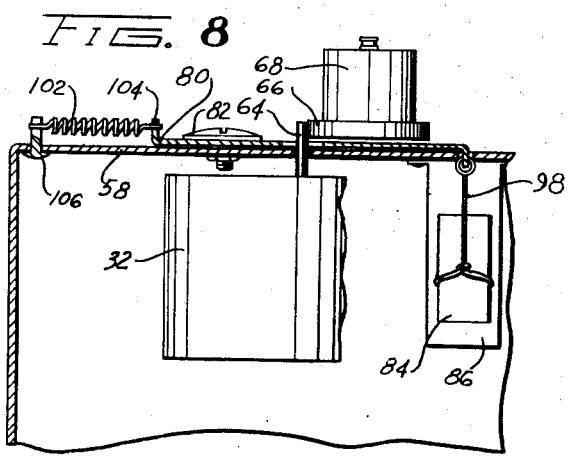
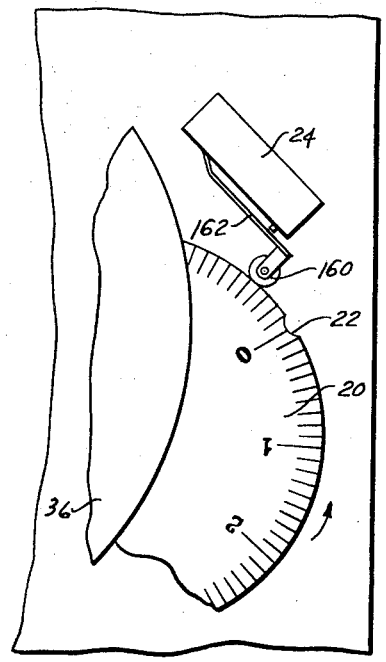
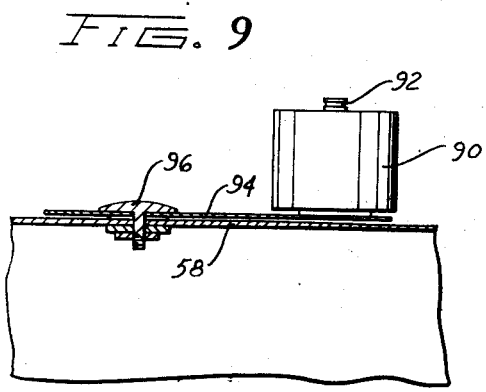
INVENTORS.
THOMAS J. VALENTINO
ROBERT FINE
BY Irving P. Goodfriend
ATTORNEY Patented July 24, 1951

2,561,602

UNITED STATES PATENT OFFICE 2,561,602

APPARATUS FOR MAKING AURAL ANNOUNCEMENTS

Thomas J. Valentino, New York, and Robert Fine, Hewlett, N. Y.

Application July 29, 1947, Serial No. 764,366

11 Claims. (Cl. 179—100.1)

The present invention relates to an apparatus which is constructed and arranged to make an aural announcement at selected periods of time.

The present invention contemplates the provision of such an apparatus in which the amplifier circuit contains a tube which serves two functions, namely, to amplify the sound and to control the operation of the apparatus.

In other words, the amplifier tube in the audio amplifying circuit is utilized to start and stop the operation of the means on which the announcement is recorded by control of the bias of the grid of the amplifier tube.

The present invention further contemplates an apparatus of this character in which means are provided on the recording of the announcement, at the end of the announcement, which cooperates with the control tube to change the bias thereof and thus stop the operation of the recording driving means.

The present invention still further contemplates the provision of such an apparatus which is returned spontaneously to condition for repeated reproduction of the announcement upon the completion of the play of any announcement.

The present invention further contemplates the provision of such an apparatus which is so constructed and arranged that it is prevented from being thrown out of synchronism at any time so that an announcement will always be commenced and stopped at the proper selected time sequence.

The present invention still further contemplates the provision in one modification thereof of an apparatus in which the announcement is recorded on a magnetic tape having an electric conducting material positioned on the tape at the end of the recording whereby the bias of the control tube is short circuited to cause movement of the tape to stop and permit return of the apparatus to playing or sound reproducing condition.

The present invention further contemplates the provision of an apparatus having mechanism for causing the recording means to return to initial position upon reaching a final sound reproducing position whereby the announcements on the recording means can be repeated in proper sequence at the selected time.

The present invention still further contemplates the provision of an apparatus in which announcements are recorded on a magnetic tape of relatively little tension strength and which is arranged and constructed so that the tape is re-rolled, at the completion of its movement in the machine without undue strain on the tape and thus reduce or eliminate any possibility of breakage of the tape.

These and other objects and advantages of the present invention will be clear from the description which follows and the drawings appended thereto, in which Fig. 1 is a diagrammatic view showing an electrical circuit for translating, amplifying and controlling the announcement recording and which may be employed in the practice of our invention, the electrical values of the specific elements and the conventional designations of the electronic tubes that may be used in the specific circuit being given.

Fig. 2 is a diagrammatic view showing the electric circuit employed in a rewind system provided in our invention, the lever on which the control switches are mounted being illustrated in full lines in rewind position and being illustrated in broken lines in their normal position for sound translating from the recording means.

Fig. 3 is a diagrammatic view of the circuit for the final power amplifier and control tube illustrated in Fig. 1.

Fig. 4 is a plan view of the housing on and in which the apparatus of our invention is carried.

Fig. 5 is a section on the line 9 of Fig. 4.

Fig. 6 is a section on the line 6—6 of Fig. 4.

Fig. 7 is a view on the line 7—7 of Fig. 6.

Fig. 8 is a section on the line 8—8 of Fig. 4.

Fig. 9 is a section on the line 9—9 of Fig. 4.

Fig. 10 is a fragmentary view of a part of Fig. 4 an element thereof shown in an advanced position.

Figure 1:
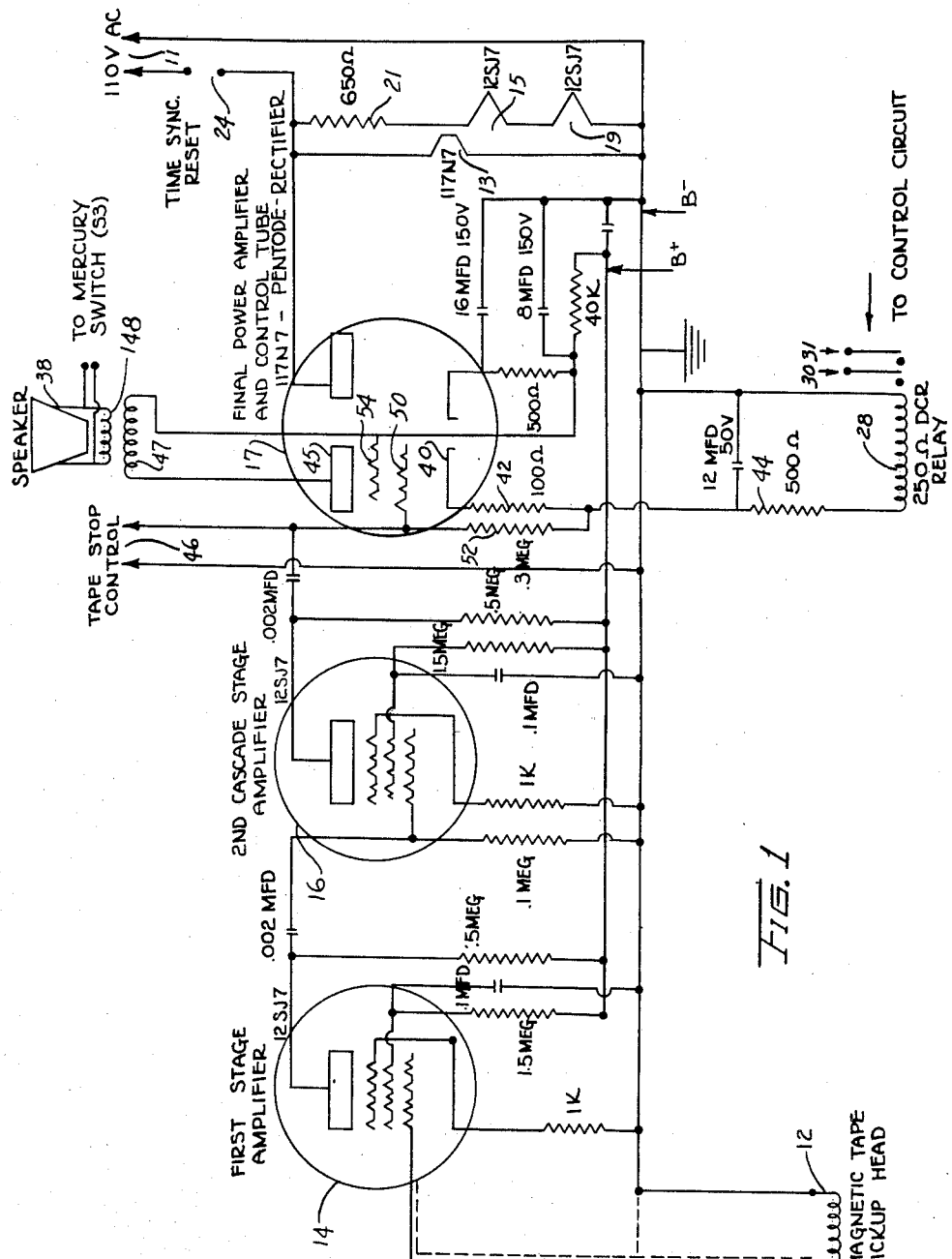

Referring now to the drawings and more particularly to Figs. 1 to 3, we have illustrated therein in diagram a circuit which may be employed in the practice of our invention, though it will be understood that other circuits than the specific one shown may be utilized.

A unit, comprising all of the elements of our invention, including the electrical elements of the various circuits, the motor drive, time mechanism and the rewind or re-roll apparatus for the recording, all of which will be described in detail, may be housed in a casing 9 (see Fig. 5), which casing as a unit may be mounted in a cabinet (not shown).

We prefer to record one or more announcements on a conventional magnetic tape 10 (see Figs. 4 and 5), though it will be understood that the announcement or announcements may be recorded on wire, film, a phonograph record or any other known means.

The announcement is reproduced by the audio amplifier circuit, such as illustrated in Fig. 1, which preferably comprises three stages of amplification. It is unnecessary to specifically describe in detail the magnetic tape pick-up head 12 or the first 14 and second 16 stage amplifier tube circuits as these are conventional and adequately illustrated in Fig. 1.

We have found in actual practice that the amplifier tubes 14 and 16 in the first two stages may comprise pentode tubes conventionally designated by the symbol 12SJ7.

In the final amplifier stage, we prefer to use a double tube 17 which, as will be seen, serves as a combined amplifier and apparatus control tube and also as a rectifier in the apparatus utilized by us, we desire that a rectifier tube be employed to eliminate alternating current hum that would otherwise be produced when the sound or announcement is translated by the amplifier utilized in the apparatus. We have found that this double tube 17 may comprise the one conventionally designated by the symbol 117N7.

It should here be noted that on the right of Fig. 1 across the power supply line 11 (which in the figures of our drawings we designate as 110 v. A. C. as this is normally found in practice) we illustrate the conventional heating element 13 for tube 17 and the heating elements 15 and 19 respectively for the tubes 14 and 16, this being the conventional manner of illustration. Inasmuch as each tube 14 and 16 operates on 12 volts there is included in series with the heating elements 15 and 19, a 650 ohm resistance 21.

Referring now to Fig. 2, which is a schematic clock diagram, we utilize a conventional time mechanism 18 which drives the cam 20, made from an insulating material such as Bakelite. We prefer that an electric clock be utilized for the time mechanism (and connected across the power line, which as pointed out is usually 110 A. C.) and since it and the cam are conventional only the schematic illustration of Fig. 2 is necessary for an understanding of our invention.

A notch 22 is provided in the cam which permits a conventional micro-switch 24 to close the power supply circuit to the amplifier 26 (the circuit diagram for which is illustrated in Fig. 1). The notch 22 in the cam 20 is made of such width so that the amplifier will have sufficient time to heat but so narrow that the micro-switch will be opened during the translation or reproduction of the announcement.

As we shall describe, after the cam 20 is disengaged from the microswitch 24 by the continued rotation of the motor 18, a circuit across the line 11 is nevertheless closed across the amplifier 26 because of the holding relay 28.

When the amplifier 26 becomes heated, the relay 28, which is arranged in the cathode circuit of the final power amplifier and control tube 17, is closed. It will be understood that normally this relay is open and is an armature type relay having holding contacts by means of which the switches 31 and 32 are operated.

It will be recognized that after the tube 17 is heated and operates, current flows therethrough and energizes the relay 28 to close the switch 31 (which remains closed so long as the relay is energized) and thus throw the amplifier 26 across the line 11; the switch 30 is concurrently closed and held closed to connect and hold the motor 32 across the line 11.

As pointed out above, the cam 20 is constructed of such dimensions that the microswitch 24 will remain closed only long enough to heat the tube 24 so that the relay 28 is energized to hold closed the switches 30 and 31, which bypasses the microswitch 24 and retains the apparatus in operating condition until the relay 28 is returned to normal condition to open the switches 30 and 31 and restore our apparatus for translation and reproduction of a succeeding announcement on the recording means, the tape 10, all as will be further described in greater detail.

The motor 32 drives the tape 10 by means of the mechanism illustrated in Fig. 5, to which further reference will be hereinafter made.

To repeat, upon energizing the relay 28, by the operation of the microswitch 24, as we have described, a circuit is closed to couple the magnetic tape pick-up to the primary 33 of the loud speaker and concurrently to commence movement of the tape 10 past the magnetic tape pick-up head 12 by means of the motor 32 which drives the transmission mechanism, illustrated in Figs. 4 and 5, to which we shall make further reference hereinbelow.

This is accomplished by driving the take-up reel 34, during the playing cycle, to unwind the tape 10 from the feeder reel 36. Thus, the recording on the tape 10 is translated by the amplifier circuits illustrated in Fig. 1, the tape 10 being driven by the motor 32 until the recording is terminated when the relay 28 is caused to drop out in the manner which we shall hereinafter describe. We shall now describe the means for stopping the sound reproduction, which is accomplished by opening the circuit for the motor drive 32 and thus stop movement of the tape 10 past the pick-up head 12 and concurrently open the circuit to the amplifier 26.

Referring now particularly to Figs. 2 and 3 (it being kept in mind that the mercury switches controlling the rewind mechanism are in the off position during the playing operation), we connect the relay 28 in series with the cathode 40 of the ambplifier and control tube 17 and the resistors 42 and 44, the anode or plate 45 being connected to B+ (plus) through the primary coil 47 of the loud speaker.

Normally the contacts 46 are open, the tape 10, which is made of a non-conducting material such as paper, moving past these contacts against which it is tensioned, as we shall further describe.

The contacts 46 may be made from brass in the form of rods on which the tape is moved. At the end of each recording, we provide on the tape on the reverse side thereof, a spot of conducting material 48, such as india ink or graphite (see Fig. 7). Thus, as the tape is moved past the brass rods 46, a circuit between them is closed by contact with 48 effectively short the circuit through the cathode 40.

At this point, it should be noted that in the circuit of the control grid 50 of the tube 17, we provide the grid return resistance 52, the screen grid 54 being connected to B+ (plus).

The contacts 46, are mounted in the housing 56, secured to the wall 58 on the outside of the apparatus housing 9 (see Fig. 4). The contacts 46 are normally open since the non-conducting paper tape 10 rides against them and the bias on the grid 50 of the tube 17 supplied by the voltage developed across the resistor 42 which in the circuit illustrated is approximately five volts.

The tape 10 (see Fig. 4) is threaded through the housing 56 of the magnetic pick-up head 12. It is not necessary to show the means for providing tension on the tape 10 as it is wound the reel 34 during the re-roll or rewinding operation, as such tension means is conventional and forms no part of the invention.

Fig. 4 shows the position of the reels just prior to the operation of the re-roll or rewind mechanism, the tape 10 being pulled from the reel 34 and wound on the reel 36 for the playing operation and riding against the posts 46, through the magnetic head housing 56 and a slot in the pivoted lever 60 (to which further reference will be made), the tension guide post 62 positioned adjacent the reel 36.

It should be noted that the iron oxide coating is positioned on one side of the magnetic tape and the spot of conducting matter 48 on the other side of the tape so that the conducting matter will engage the posts 46 as the magnetic tape is moved past them to change the tube 17 bias as heretofore described.

However, when the contacts 46 are closed by being engaged by the spot of conducting material 48 on the tape 10, the bias on the grid 50 is changed and becomes dependent upon the voltage developed across the resistor 42 plus that developed across the resistor 44 and the resistance of the relay 28, which voltage rises to approximately fifteen volts. This lowers the plate current in the tube 17 causing the relay 28 to open and thus open the switches 30 and 31. This opens the circuit across the motor 32 and the circuit across the amplifier 26 to stop movement of the tape 10 and amplifier translation of the recording on it. It should be here recognized that the microswitch 24 is open and thus the entire apparatus returned to non-reproducing condition for the next announcement. The momentum of the motor 32 and the reels 34 and 36 carries the conducting spot 48 beyond the contacts 46 to thus return them to open condition and place the apparatus in condition to again be operated in the manner heretofore described upon again closing the microswitch 24 by operation of the cam 20 as it is driven by the time mechanism 18.

It will of course be understood that the timing mechanism 18 will be designed so that the microswitch 24 is closed at the selected periods to permit the announcements to be sequentially made at the selected times. For example, the clock motor of the mechanism 18 may be designed to rotate once every fifteen minutes and one or more notches 22 may be cut in the cam 20. The microswitch is arranged to be closed so that the tape will be driven by the motor, which latter is operated at a speed at which an announcement will be reproduced, at the desired periods and continue for a selected time.

In other words, the motor drive and amplifier are operated at times determined by the notch or notches 22 cut in the cam 20 and the speed of the time mechanism drive, which is operated by the time mechanism 18 (schematically shown) which are synchronized with the length of the recording on the tape and the speed at which it is driven.

The circuits to the motor drive and amplifier are opened upon the completion of the announcement by means arranged to change the bias of a control and amplifier tube, such as illustrated and described hereinabove, which means is arranged to be actuated at the termination of the particular recording on the tape or other means for carrying the recording.

We have found that the use of a continuous reel for the purposes here contemplated is not commercially practical. We use, in our apparatus, a strip of magnetic tape 10 which is secured at each of its ends to a reel 34 and a reel 36. Therefore, we have devised a mechanism for rewinding or re-rolling the magnetic tape 10 on the feeder reel 34 after the tape has been completely wound on the take-up reel 36 by the operation of the apparatus as heretofore described. We shall now describe this re-roll or rewind mechanism.

Referring now particularly to Figs. 4 and 5, the motor 32 is suspended in any suitable manner on the underside of the top 58 of the housing 9. The motor shaft 64 extends outwardly above the top 58 of the housing 9 and frictionally engages the roller drive 66 (see Fig. 8) on the underside of the idler cyclinder 68.

The cylinder roller 68 is normally held in engagement with the take-up reel 36 by means of tension spring 70, one end of which is secured to the screw 72 below the wall 58, to which the screw is secured.

The other end of the spring 70 is secured to the under collar 74 on the shaft 76 of the combined roller drive 66 and idler cylinder 68. The motor shaft 64 extends through the slot 78 of the pivoted member 80, which member is secured to the top 58 by means of the pivot screw 82.

The member 80 may oscillate between the left and right of Fig. 4 about the pivot 82, under the influence of the plunger 84 upon energizing the relay 86 to operate the re-roll or rewind mechanism as we shall further describe.

The motor shaft 64 is stationary and frictionally engages the roller drive 66 to drive the cylinder 68 at all times. During the playing cycle, the cylinder 68 is normally positioned against the take-up reel 36 away from the counter driving cylinder 90 which latter is mounted on the shaft 92 secured to the pivoted member 94, which member 94 is mounted on the tops 58 by the pivot 96.

Upon moving the plunger 84 inwardly under the influence of the relay 86, as will be described, the shaft 76 and the unit comprising the roller 66 and cylinder 68 are pulled by the cable 98 against the tension of the spring 70. The number 80 is thus moved about the pivot 82 to bring the roller 66 into frictional engagement with the driving counter roller 90. The member 94 is correspondingly, moved about the pivot 96 to bring the driving roller 90 into engagement with the feeder reel 34 and thus drive it so long as it is held thereagainst by the pull of the plunger 84.

It will be recognized that during movement of the member 80, the roller 66 is held against the driving collar 100 on the upper end of the motor shaft 64 so that rotation of the motor 32 will operate the take-up reel 36 in the proper direction when the roller 68 is normally positioned against the take up reel 36 and through the counter roller 90, engaged by the collar 66, drive the feeder roll 34 for the re-roll or rewind operation, when the collar 66 is moved against the counter roller 90, which latter is moved against the feeder reel 34, all under the influence of the plunger 84.

In order to maintain the member 80 in proper position so that it will oscillate under the influence of the plunger 86 and spring 70 about the pivot 82, we secure one end of the tension spring 102 to the upturned finger 104 of the member 80 and the other end of the spring 102 to the rivet or set screw 106 on the upper part of the top 58 of the housing 9.

Referring now to Figs. 4, 6 and 7, we have illustrated the pivoted lever 60, in normal position, for the playing operation, and pivoted to the left of Figs. 4 and 7. The lever 60 is secured to the U-shaped bracket 108 extending down from the top 58 of the housing 9 by means of the pivot 110 and moves from one end of the slot 112 in the top 58 (as shown in full lines in Fig. 4, from the playing cycle) to the other end of the slot 112 (as shown in broken lines in Fig. 4 for the rewind or re-roll operation).

Secured on the lever 60, we provide the conventional mercury switches 114, 116 and 118 from which extend the glass enclosed electrodes 120, 122 and 124.

In the normal position for the playing cycle as illustrated in Fig. 7, the switches 114, 116 and 118 are open because the mercury 126, 128 and 130, which closes these switches moves by gravity away from the electrodes 120, 122 and 124 (which are each covered by the insulation boots 132, 134 and 136) to thus open the switches.

At the upper end of the member 60, we rivet to it the angle member 138 to thereby provide the channel 140 in which the tape 10 is moved from left to right of Figs. 4 and 7 during the playing operation to unwind the magnetic tape from the reel 34 as it is wound on the reel 36. The magnetic tape is relatively thin being approximately 0.002″ in thickness whereas the slot is relatively wider being approximately 0.032″ in width. Thus the magnetic tape 10 moves freely in the slot 140.

In order to prevent the magnetic tape 10 from breaking during the re-roll or rewind operation, we preferably connect to each end of the magnetic tapet 10 to a strong ribbon (such as nylon) or film leader, which is also approximately the thickness of the tape 10.

As the end of the playing cycle approaches, this leader comes off the feeder or source reel 34 and is preferably arranged so that at least two turns of the leader are wrapped around each of the reels 34 and 36, which arrangement prevents undue strain on the relatively weak paper tape 10 and its possible consequent breakage during the re-roll and rewind operation. At this point on the leader, a metal bead 142 is secured to the leader, which metal bead 142 is approximately $\frac{1}{16}$ of an inch thick.

The bead 142 is too thick to pass through the channel 140 and therefore, as the tape 10 is pulled through the slot 140 by the take-up reel 36, the bead 142 engages the lever 60 to move it about the pivot 110 and tilt it and all of the switches into switch closing position.

Referring now to Fig. 2, the mercury switch 114 connects the relay 86 across the line by means of the mercury 126 and the leads 144 and 146, which latter are connected to the electrodes 120. The plunger 84 is thus attracted to pull the member 80 about its pivot 82 and connect the motor 32 to the reel 34 and disconnect it from the reel 36. Movement of the tape is thus reversed from right to left of Figs. 4 and 7 to re-roll or rewind the tape 10 on the reel 34.

In order to prevent any play and sound by reason of the magnetic tape 10 being moved through the magnetic tape pick-up head 12 (housing 56 therefor), we mount the mercoid switch 118 on the member 60, the electrodes 124 of which are connected across the voice coil 148 of the loud speaker 38 by means of the leads 150 and 152. Upon closing the mercury switch 118 by means of the electrodes 124 and mercury 130, the voice coil 148 is thus shorted to prevent operation of the loud speaker.

In order to operate the motor 32 for the rewind or re-roll sequence, after it has been stopped by contact of the stop mark 48 with the brass rods 46 at the end of the last recording, we mount on the lever 60 the mercury switch 116 which is closed by the mercury 128 when the switch is tilted. The electrodes 122 of the mercury switch 116 are connected by the leads 154 and 156 to the driving motor 32, which is thus connected across the power source when the mercury 128 makes contact with the switch electrodes.

Thus, the rewind or re-roll operation is accomplished by a means (such as the bead 140 and pivoted lever 60) positioned at the end of the recording, which means serves to concurrently reverse operation of the reels (as by energizing the relay 86), throw the driving motor across the power line and short circuit the voice coil, by means of which the recording is translated.

While we prefer to use mercury switches and a pivoted lever on which they are mounted, other means such as microswitches to be opened and closed by operation of the relay plunger, may be used.

A bead similar to that on the leader that is wound around the reel 34 is mounted on the leader that is wound around the reel 36. Thus, as this second mentioned leader is unwound from the reel 36, the bead thereon engages the lever 60 and carries it back in the slot 112 from the position illustrated in broken lines in Fig. 4 to the position illustrated by full lines in that figure.

By this operation, the switches 114, 116 and 118 are concurrently opened, thus disconnecting the relay 86 releasing the plunger 84 to permit the roller 68 to be spontaneously returned into engagement with the reel 36 by means of the spring 70, disconnecting the drive motor 32 from the power line and disconnecting the voice coil 148 from the power line.

By this operation, our apparatus is returned to normal operating condition whereby periodic spot announcements may again be made from the magnetic tape 10. It will of course be understood that this entire re-roll or rewind operation is arranged to be performed before the microswitch 24 will again be closed by the cam 20.

It will be recognized that it may be necessary to synchronize the magnetic tape 10 with the time mechanism driven cam 20, which for any reason may be out of sequence. We accomplish this by means of a conventional spring operated reset switch 158, normally open, and which is connected across the line to the amplifier 26 and the relay 28 (see Fig. 2).

In the illustration given, we divide the cam 22 into equal parts so that such resetting or synchronizing operation may be visually and easily accomplished, the notch 22 being positioned at the zero mark for engagement with the roller 160 on the arm 162 of the microswitch 24 (see Fig. 10, which illustrates a position of the cam 20 assumed by movement after closing of the microswitch 24).

In order to protect the apparatus, we also provide therein in the conventional manner a fuse 164.

The reel 34 is detachably mounted on the shaft 166 on the housing top 58 and the reel 36 is detachably mounted on the shaft 168 on the top 58.

The present invention will of course be applicable to any device by means of which it is sought to synchronize any mechanical movement with the amplification and translation of sound.

It is to be understood that the practical embodiments of our invention that have heretofore been described and illustrated are by way of example only and are not to be considered as limiting such invention.

Hence, we desire to be protected for any modifications or variations of the invention that may be made within its spirit and scope and within the scope of the claims hereto appended.

We claim:

1. In an apparatus of the character described, means having a sound recording thereon, means for translating the sound recording, means for moving the means having the sound recording thereon through the translating means, an amplifier coupled to said translating means, an electronic tube in said amplifier to function normally as an audio tube, said tube having a selected grid bias to provide the desired audio amplifier operating point of the tube, a control circuit for said means for moving the means having the sound recording thereon and coupled to the electronic tube and means for shorting out the said selected grid bias of the electronic tube to thereby cause said tube to draw an abnormal amount of plate current, said last mentioned means operated by the said means having the sound recording thereon, said control circuit operated upon shorting out the selected grid bias to stop operation of the means for translating the means having the sound recording thereon.

2. The apparatus of claim 1, said shorting means including a conducting material on the means having the sound recording thereon at the end of said sound recording and electrode contacts for engagement by said conducting material, said electrode contacts being arranged in the control circuit.

3. In an apparatus of the character described, a sound recording means, means for moving the sound recording means for translating the sound recording thereon, a control circuit, said moving means arranged in said control circuit, an amplifier, an electronic tube in said amplifier, said tube having a normal operating grid bias said electronic tube functioning as an audio tube upon impressing the normal operating grid bias thereon, and a means for closing the circuit across the amplifier and the moving means, said closing means in the electronic tube circuit and operable for circuit closing upon impressing across the said electronic tube the normal operating grid bias and operable to open the circuit across the amplifier and the moving means upon shorting the grid bias.

4. The apparatus of claim 3, and including, on the sound recording means, means for changing the normal operating grid bias whereby the said circuit closing means is opened.

5. In an apparatus of the character described, means having a spot announcement recorded thereon, means for moving the announcement recording means, a control circuit for said moving means, an amplifier including an electronic tube, said tube having a normal operating grid bias said control circuit coupled to said electronic tube, and a means for closing the circuit across the amplifier, said closing means arranged in the electronic tube circuit and operable upon impressing across the said electronic tube the normal operating bias said tube thereupon constituting an audio amplifier tube, said closing means operable to open the electronic tube circuit and the control circuit upon shorting out the normal operating grid bias of the electronic tube.

6. The apparatus of claim 5 and including, at the end of the spot anouncement recorded on the first mentioned means, means for shorting the control grid of said electronic tube to thereby change from normal the tube operating bias whereby the closing means is opened.

7. The apparatus of claim 5 and including at the end of the spot announcement recorded on the first mentioned means, an electric conducting material and a pair of spaced electrodes in a circuit having the control grid of the said electronic tube arranged therein, the spacing between the electrodes being bridged upon engagement by said electric conducting means to close the said circuit in which the control grid is arranged and thereby change the tube bias whereby the closing means is opened.

8. In an apparatus of the character described, announcement recording means, means for moving the recording means, an amplifier including an electronic tube, said tube having a normal operating grid bias to thereby function as an audio amplifier tube, a normally open microswitch for closing a circuit across the amplifier, a cam operated by a time mechanism for closing the said microswitch, a normally open armature relay for closing the circuit across the amplifier and a circuit across the moving means, the coil of said armature relay in the cathode circuit of said electronic tube and energized upon closing the circuit across the amplifier by said microswitch, and means for changing the operating grid bias of the electronic tube at the end of the announcement on said recording means whereby the coil of the armature relay is deenergized to open the circuit across the amplifier and the circuit across the moving means.

9. The apparatus of claim 8, said means for changing the grid bias of the electronic tube comprising an electric conducting material on the announcement recording means and a pair of spaced electrodes in a circuit in which the control grid of the said electronic tube is arranged, the spacing across the electrodes being bridged upon engagement by said conducting means to close the said circuit in which the control grid is arranged and thereby change the normal operating grid bias.

10. In an apparatus of the character described, a magnetic tape having spaced spot announcements recorded thereon, a feeder reel for said tape, a take-up reel for said tape, means for rotating the said reels to move the tape in the apparatus from one reel to the other, means for translating and amplifying the spot announcements, said translating and amplifying means having a normal operating bias, a means for closing a circuit in the translating and amplifying means and the reel rotating means said circuit closing means operable to close the said circuits upon impressing across the said translating and amplifying means the said normal operating bias and to open said circuits upon impressing across the said translating and amplifying means an operating bias differing from normal, an electric conducting material on the tape and a pair of spaced electrodes engaged by the tape, said electrodes in a circuit for shorting the translating and amplifying means whereby the normal operating bias is changed, said shorting being closed upon bridging the spacing between the electrodes by the conducting material upon movement of the tape to bring the conducting material in contact with the electrodes.

11. In an apparatus of the character described, a sound reproducing means, an amplifier for said sound reproducing means, an electronic tube in the amplifier and having a normal operating grid bias to function as an audio amplifier, a control circuit for the sound reproducing means, a relay in the control circuit and coupled to the electronic tube in the amplifier and means for changing the normal operating grid bias of the amplifier tube to operate the relay in the control tube circuit.

THOMAS J. VALENTINO.
ROBERT FINE.

REFERENCES CITED

The following references are of record in the file of this patent:

UNITED STATES PATENTS

| Number | Name | Date |
|---|---|---|
| 2,068,106 | Horn | Jan. 19, 1937 |
| 2,091,756 | Fodor | Aug. 31, 1937 |
| 2,252,327 | Lovett et al. | Aug. 12, 1941 |
| 2,282,271 | Terroni | May 5, 1942 |
| 2,290,570 | Paddle | July 21, 1942 |
| 2,328,539 | Greenleaf et al. | Sept. 7, 1943 |
| 2,335,277 | Heller | Nov. 30, 1943 |
| 2,344,541 | Ferris | Mar. 21, 1944 |
| 2,369,017 | Camras | Feb. 6, 1945 |
| 2,379,548 | Squire | July 3, 1945 |
| 2,412,318 | Camras | Dec. 10, 1946 |
| 2,455,922 | Englander | Dec. 14, 1948 |

FOREIGN PATENTS

| Number | Country | Date |
|---|---|---|
| 490,210 | Great Britain | Aug. 4, 1938 |